Nov. 8, 1949 — H. J. YELKIN — 2,487,504
CLUTCH ASSEMBLY TOOL
Filed Dec. 20, 1945 — 2 Sheets-Sheet 1

Inventor
Herman J. Yelkin.

By Clarence A. O'Brien
and Harvey B. Jacobson
Attorneys

Nov. 8, 1949 — H. J. YELKIN — 2,487,504
CLUTCH ASSEMBLY TOOL
Filed Dec. 20, 1945 — 2 Sheets-Sheet 2

Inventor
Herman J. Yelkin.

By Clarence A. O'Brien
and Harvey B. Jacobson
Attorneys

Patented Nov. 8, 1949

2,487,504

UNITED STATES PATENT OFFICE 2,487,504

CLUTCH ASSEMBLY TOOL

Herman J. Yelkin, Long Beach, Calif.

Application December 20, 1945, Serial No. 636,189

3 Claims. (Cl. 29—274)

1

This invention relates to a tool for use in readily disposing and holding the driving disc of a motor vehicle clutch in proper centered relation to the fly wheel and the pressure plate assembly of the clutch while bolting such assembly to the fly wheel, whereby the hub of the driving disc is accurately aligned with the bearing provided in the engine drive shaft for the pilot portion of the transmission drive shaft and so that the latter shaft may be readily entered into said hub and said bearing to facilitate re-mounting of the transmission after renewing or repairing parts of the clutch.

An important object of the present invention is to provide a tool of the above kind which is comparatively simple and compact in construction, easy to use, and efficient in use.

Broadly stated, the present tool comprises coaxial expansible and contractable inner and outer portions disposed in end to end relation and adapted to be adjusted for snug engagement respectively in the hub of the driving disc of a clutch and in the bearing provided in an engine drive shaft for the pilot portion of a transmission drive shaft so as to align said hub with said bearing while bolting the pressure plate assembly of the clutch to the fly wheel carried by the engine drive shaft, said expansible and contractable outer portion being smaller than the inner portion, and means including manually operable handles at the inner end of said inner portion for independently adjusting said portions according to the sizes of said hub and said bearing. Each expansible portion of the tool preferably consists of a plurality of radially adjustable segmento-cylindrical sections, and the sections of each portion are yieldingly contracted, the means for expanding the sections of each portion preferably including conical members between which the sections are arranged, one of said conical members being manually movable toward the other so as to wedge the sections outwardly.

The present invention consists in the novel form, combination and arrangement of parts hereinafter more fully described, shown in the accompanying drawings and claims.

In the drawings:

Figure 1 is a view partly in elevation and partly in vertical section, illustrating the present tool in use.

2

Figure 1:
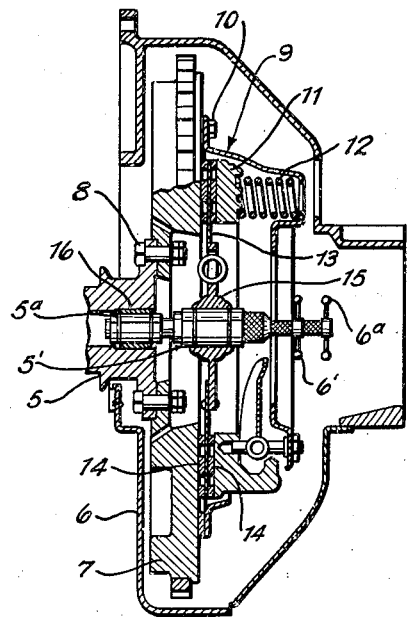
Figure 2:
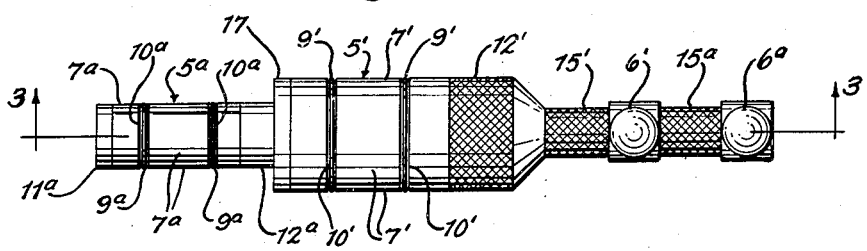
Figure 2 is a plan view of the tool shown in Figure 1, drawn on an enlarged scale.

Referring in detail to the drawings, 5 indicates the drive shaft or crank shaft of a motor vehicle engine, and 6 indicates a housing within which is arranged a fly wheel and clutch assembly. The fly wheel and clutch assembly includes a fly wheel 7 bolted at 8 to the end of the shaft 5, a pressure plate assembly 9 bolted at 10 to the rear side of the fly wheel 7 and including a pressure plate 11 urged by springs at 12 toward the fly wheel, and a driving disc 13 provided with friction facings as at 14 and including a hub 15, the friction facings 14 being provided on opposite faces of the disc 13 at the margin of the latter for respective engagement with the adjacent faces of the fly wheel 7 and pressure plate 11. The end of drive shaft 5 is provided with a bearing 16 for the pilot portion of the drive shaft of the vehicle transmission, and the hub 15 of the disc 13 has an opening of larger diameter than the bearing 16 and is formed with key-ways for reception of the splined portion of the transmission drive shaft, as is well known in the art. When renewing or repairing parts of the clutch, it is necessary to remove the transmission by withdrawing its drive shaft from the hub 15 and bearing 16, so that the pressure plate assembly 9 and the disc 13 may be removed. After the parts of the clutch have been renewed or repaired, it becomes necessary to assemble the disc 13 in proper relation to the fly wheel 7 while the assembly 9 is being bolted to the fly wheel, such relation being such that the hub 15 is accurately aligned with the bearing 16. It is the purpose of the present tool to facilitate this alignment of hub 15 with bearing 16 so that remounting of the transmission is facilitated.

The present tool comprises coaxial expansible and contractable inner and outer portions 5' and 5a which are disposed in end to end relation and are adapted to be adjusted for snug engagement respectively in the hub 15 of the driving disc 13 and in the bearing 16 provided in the engine drive shaft 5. The portion 5a is smaller than the portion 5' due to the fact that the opening or bore of hub 15 is always of greater size than the bore of bearing 16. Means, including manually operable handles 6' and 6a at the inner end of the inner portion 5', are provided for independently adjusting the portions 5' and 5a according to the sizes of the hub and the pilot bearing of the disc 13 and shaft 5, respectively.

Figure 3:
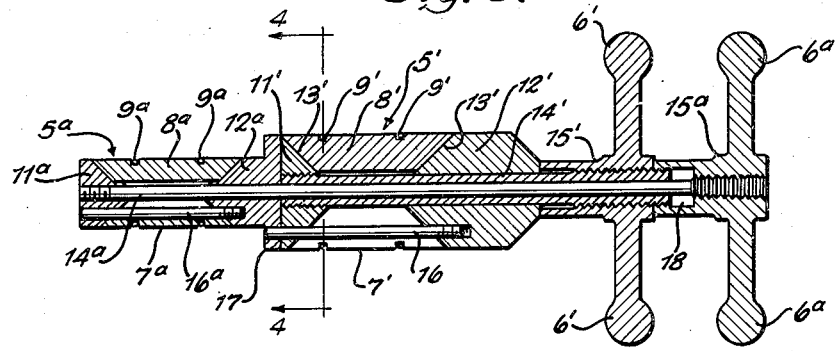
Figure 3 is a central longitudinal section taken on line 3—3 of Figure 2.
Figure 4:
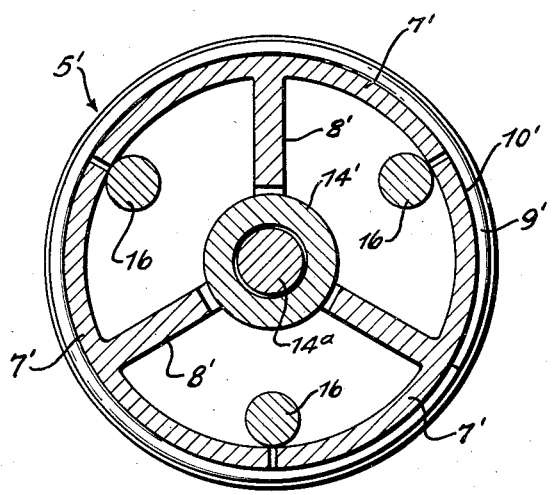
Figure 4 is an enlarged transverse section taken on line 4—4 of Figure 3.
Figure 5:
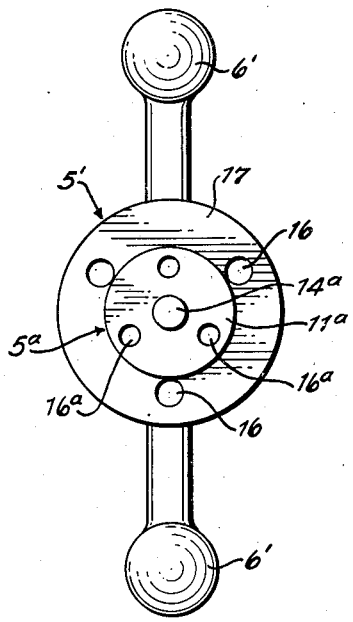
Figure 5 is an end view looking toward the right of Figure 2 and drawn on an enlarged scale.

The portion 5' preferably consists of a plurality of radially movable segmento-cylindrical sections 7', each having a central longtitudinal inwardly extending radial rib 8'. The sections 7' are normally yieldingly contracted by means of a pair of resilient split rings 9' which are seated in spaced circumferential grooves 10' provided in the outer surfaces of the sections 7'. Cones 11' and 12' are disposed at opposite ends of the sections 7' and disposed to face toward each other. The ends of the ribs 8' are beveled in inwardly converging relation as shown in Figure 3 and are slidably engaged in longitudinal grooves provided at 13' in the conical surfaces of the cones 11' and 12'. By slidably disposing the ends of the ribs 8' in the grooves 13', the sections 7' are properly guided and prevented from having circumferential displacement relative to the cones 11' and 12'. The cone 11' is secured on the outer end of a tubular shaft 14' that is disposed axially of the sections 7' and slidably extends through a central bore of the cone 12'. The inner end of shaft 14' projects beyond the inner end of cone 12' and is externally threaded for adjustable threaded engagement in the hub 15' of handles 6', which hub 15' bears against the inner end of cone 12'. Obviously, by turning hub 15' by means of handles 6', the shaft 14' may be adjusted longitudinally so as to draw the cone 11' toward the cone 12' for expanding the sections 7', or so as to move the cone 11' away from the cone 12' and permit the sections 7' to be contracted by the rings 9'. Rotation of cone 12' is prevented by means of guide rods 16 secured to cone 12' and slidably extending through cone 11', said guide rods being disposed parallel with the shaft 14' and about the latter at points intermediate the ribs 8'. Rods 16 are also disposed inwardly of the sections 7' as shown in Figure 4.

The portion 5a is smaller than the portion 5', but is constructed in a similar manner to operate in a similar way. The sections of the portion 5a are indicated at 7a, the ribs thereof at 8a, the contracting rings at 9a, the grooves for rings 9a at 10a, and the cones at 11a and 12a. Cone 11a is secured on the outer end of a shaft 14a that is smaller than shaft 14' and slidably extends through cone 12a and shaft 14'. The inner end of shaft 14a projects beyond the inner end of shaft 14' and the hub 15' of handles 6', and is externally threaded for adjustable threaded reception of the hub 15a of handle 6a. Hub 15a abuts the hub 15', and the guide rods 16a are carried by cone 12a and slidably extend through the cone 11a as described with respect to the cones 11' and 12' and guide rods 16. The cone 12a is preferably provided at its inner end with an external annular flange 17 that is of the same diameter as the larger end of the cone 11' and that abuts the latter and is provided with openings to slidably receive the guide rods 16. Obviously, rotation of hub 15a may draw cone 11a toward cone 12a to expand the sections 7a, or may move cone 11a away from cone 12a to permit contraction of sections 7a by rings 9a, depending upon the direction of rotation of said hub 15a. It will be noted that the inner end of hub 15a extends outwardly beyond the threaded inner end portion of shaft 14a and is provided with a relatively large counter bore 18 so as to not interfere with the longitudinal adjustment of shaft 14' with respect to the hubs 15' and 15a.

In using the present tool, the portion 5a is inserted through the hub 15 until it engages in the bearing 16 and the portion 5' engages in the hub 15. The portions 5' and 5a are then expanded to have snug engagement within hub 15 and bearing 16 as shown in Figure 1, so that with the tool held in a horizontal position the hub 15 will be accurately aligned with bearing 16 while the assembly 9 is being bolted to the fly wheel 7. Thus, upon removal of the tool, the pilot portion of the transmission drive shaft may be readily entered into the bearing 16 and the splined portion of said shaft may be readily entered into the hub 15 to facilitate expeditious remounting of the transmission. By reason of the adjustable nature of the portions 5' and 5a, the tool can be effectively employed in connection with motor vehicles whose pilot bearings and driving disc hubs are of different sizes, thereby rendering it unnecessary to provide a different tool for each particular job. Without a tool of the present kind, the work of assembling the clutch and remounting the transmission is a tedious and time-consuming one, but with the use of the present tool, the work may be performed with ease and expeditiously. Minor changes may be made in details of construction such as fall within the spirit of the invention as claimed.

What I claim is:

1. In a clutch assembly tool, the combination of a tubular shaft having a cone secured on its outer end, a second cone slidable on said shaft inwardly of the first-named cone, an expansible and contractable element embodying segmento-cylindrical sections disposed about said shaft between said cones and having circumferential grooves, resilient split rings seated in said grooves for normally contracting said sections, a handle adjustably threaded on the inner end of said shaft and having a hub engaged with said second cone, said handle being operable to relatively move the cones to expand and permit contraction of said element, a second shaft slidable in and projecting beyond the ends of said tubular shaft, a third smaller cone secured on the outer end of said second shaft, a fourth smaller cone slidable on the second shaft and abutting the first-named cone, a second expansible and contractable element embodying segmento-cylindrical sections disposed about the second shaft between the third and fourth cones and having circumferential grooves, further resilient split rings seated in the last-named circumferential grooves to normally contract the sections of the second expansible and contractable element, and a second handle adjustably threaded on the inner end of said second shaft and having a hub engaged with the hub of the first named handle, said second handle being operable to relatively move the third and fourth cones to expand and permit contraction of said second element, said second element being of smaller diameter than the first element when said elements are contracted.

2. The construction defined in claim 1, wherein said cones have longitudinal grooves in their conical surfaces, said sections having central longitudinal, inwardly extending ribs provided with beveled ends slidably engaged in said longitudinal grooves of the cones.

3. The construction defined in claim 1, wherein said cones have longitudinal grooves in their conical surfaces, said sections having central longitudinal inwardly extending ribs provided with beveled ends slidably engaged in said longitudinal grooves of the cones, in combination with guide rods disposed about and parallel with said shafts within each element, said guide rods being secured at corresponding ends to one cone and slidably extending through the other cone.

HERMAN J. YELKIN.

REFERENCES CITED

The following references are of record in the file of this patent:

UNITED STATES PATENTS

| Number | Name | Date |
| --- | --- | --- |
| 1,432,121 | Prickett | Oct. 17, 1922 |
| 1,448,528 | Elliott | Mar. 13, 1923 |
| 1,822,649 | Evans | Sept. 8, 1931 |
| 1,986,156 | Nelson | Jan. 1, 1935 |
| 2,044,818 | Spase | June 23, 1936 |
| 2,046,774 | Oertel | July 7, 1936 |
| 2,067,442 | Frisz | Jan. 12, 1937 |
| 2,097,372 | Ho et al. | Oct. 26, 1937 |
| 2,226,078 | Spahn | Dec. 24, 1940 |

FOREIGN PATENTS

| Number | Country | Date |
| --- | --- | --- |
| 774,223 | France | Sept. 17, 1934 |